(12) United States Patent
Chen et al.

(10) Patent No.: US 11,994,764 B2
(45) Date of Patent: May 28, 2024

(54) DISPLAY DEVICE

(71) Applicant: Suzhou China Star Optoelectronics Technology Co., Ltd., Jiangsu (CN)

(72) Inventors: Lu Chen, Jiangsu (CN); Qiong Liu, Jiangsu (CN); Junjie Li, Jiangsu (CN); Bangyin Peng, Jiangsu (CN); Dan Cao, Jiangsu (CN)

(73) Assignee: Suzhou China Star Optoelectronics Technology Co., Ltd., Suzhou (CN)

( * ) Notice: Subject to any disclaimer, the term of this patent is extended or adjusted under 35 U.S.C. 154(b) by 0 days.

(21) Appl. No.: 17/623,288

(22) PCT Filed: Dec. 16, 2021

(86) PCT No.: PCT/CN2021/138769
§ 371 (c)(1),
(2) Date: Dec. 28, 2021

(87) PCT Pub. No.: WO2023/103003
PCT Pub. Date: Jun. 15, 2023

(65) Prior Publication Data
US 2024/0036388 A1   Feb. 1, 2024

(30) Foreign Application Priority Data
Dec. 10, 2021  (CN) .......................... 202111505897.X

(51) Int. Cl.
*G02F 1/1335* (2006.01)
*F21V 8/00* (2006.01)
*G02F 1/1333* (2006.01)
*G02F 1/13357* (2006.01)

(52) U.S. Cl.
CPC ..... *G02F 1/133528* (2013.01); *G02B 6/0088* (2013.01); *G02F 1/133314* (2021.01); *G02F 1/133608* (2013.01)

(58) Field of Classification Search
CPC ......... G02F 1/133528; G02F 1/133314; G02F 1/133608; G02B 6/0088
See application file for complete search history.

(56) References Cited

U.S. PATENT DOCUMENTS

2014/0098513 A1   4/2014   Yi

FOREIGN PATENT DOCUMENTS

| CN | 1208664 | 6/2005 |
|----|---------|--------|
| CN | 104765185 | 7/2015 |
| CN | 205910457 | 1/2017 |
| CN | 106547140 | 3/2017 |

(Continued)

OTHER PUBLICATIONS

Machine translation of CN 106547140A (Year: 2017).*

(Continued)

*Primary Examiner* — Anne M Hines

(57) ABSTRACT

A display device is provided. The display device includes a back frame, a display module, and a polarizer. The back frame has a cavity, and the display module is disposed in the cavity. The polarizer is arranged on the display module and a body of the back frame surrounding the display module. The polarizer is extended to the back frame in the non-display area, thereby removing a front frame in the prior art, reducing a thickness of the display device, and increasing an area of the display area.

20 Claims, 3 Drawing Sheets

(56) References Cited

FOREIGN PATENT DOCUMENTS

| CN | 206039087 | 3/2017 |
| CN | 107167963 | 9/2017 |
| CN | 109254449 | 1/2019 |
| CN | 212675313 | 3/2021 |
| CN | 213634051 | 7/2021 |
| KR | 10-2017-0116845 | 10/2017 |
| KR | 10-2018-0088784 | 8/2018 |
| TW | 695192 | 6/2020 |

OTHER PUBLICATIONS

International Search Report and the Written Opinion dated Jun. 27, 2022 From the International Searching Authority Re. Application No. PCT/CN2021/138769 and Its Translation Into English. (20 Pages).

Notification of Office Action and Search Report dated Jan. 3, 2023 From the State Intellectual Property Office of the People's Republic of China Re. Application No. 202111505897.X and Its Translation Into English. (17 Pages).

* cited by examiner

DISPLAY DEVICE

RELATED APPLICATIONS

This application is a National Phase of PCT Patent Application No. PCT/CN2021/138769 having International filing date of Dec. 16, 2021, which claims the benefit of priority of Chinese Patent Application No. 202111505897.X filed on Dec. 10, 2021. The contents of the above applications are all incorporated by reference as if fully set forth herein in their entirety.

FIELD AND BACKGROUND OF THE INVENTION

The present application relates to the field of display technologies, and more particularly to a display device.

With the gradual development of the display industry, display devices with narrow bezels, high proportion, and light and thin have become key items in the competition of high-end screens. Currently, the overall structure of the display device comprises a back frame plus a display module plus a front frame.

Narrowing and thinning of a frame of a display module is close to a process limit, and it is difficult to make further breakthroughs. The narrowing and thinning of a back frame and a front frame have also reached a challenge. It is difficult to make a narrower and thinner back frame and front frame with the existing manufacturing process. The structure of the display module cannot be optimized to achieve a better viewing experience.

Technical Problem

The purpose of the present invention is to provide a display device to solve the technical problem that the display device in the prior art cannot further reduce a panel structure.

SUMMARY OF THE INVENTION

To achieve the above objective, the present invention provides a display device, which includes a back frame, a display module, and a polarizer. The back frame has a cavity, and the display module is disposed in the cavity. The polarizer is disposed on the display module and a body of the back frame surrounding the display module.

Further, the display device has a display area and a non-display area surrounding the display area.

The back frame comprises a bottom plate and a side plate. The bottom plate is disposed on a surface of the display module away from the polarizer and covers the display area and the non-display area. The side plate is vertically connected to the bottom plate and located in the non-display area. The bottom plate and the side plate enclose the cavity.

Further, the non-display area comprises a frame area and a bottom frame area connected to the frame area. The polarizer comprises a main body and an extension part. The main body is disposed on the display module and covers the display area. The extension part is disposed on the side plate and located in the frame area.

Further, the side panel comprises a first frame and a second frame. The first frame is located in the frame area. The second frame is located in the bottom frame area. A height of the first frame is smaller than a height of the second frame. A surface of the second frame away from the bottom plate and a surface of the polarizer away from the display module are located on a same plane.

Further, the display module extends from the display area into the bottom frame area. In the bottom frame area, a distance between the display module and the second frame is smaller than a distance between the polarizer and the second frame.

Further, the display device further includes a light shielding layer and a high-viscosity layer. The light-shielding layer covers a surface of the display module facing the side plate and being located in the non-display area. The high-viscosity layer is disposed between the extension part and the side plate.

Further, the light-shielding layer includes a first light-shielding layer and a second light-shielding layer. The first light-shielding layer is located in the frame area, and an end of the first light-shielding layer close to the polarizer extends from a surface of the display module facing the side plate to a surface of the extension part facing the side plate. The second light-shielding layer is located in the bottom frame area, and two ends of the second light-shielding layer respectively extend to a surface of the display device facing the bottom plate and a surface of the display device facing a front frame.

Further, the display device further includes a front frame, the front frame is disposed on an edge of the display module and located in the bottom frame area.

Further, the display module includes a backlight module and a display panel. The backlight module is arranged in the cavity. The display panel is disposed between the backlight module and the polarizer.

Further, the display device further includes a fixing layer, and the fixing feet are disposed between the display module and the back frame.

Beneficial Effect:

The advantage of the present invention is that the display device of the present invention extends the polarizer to the back frame in the non-display area. The display module is protected by the polarizer, thereby removing the front frame in the prior art. A thickness of the display device is reduced, an area of the display area is increased, a screen-to-body ratio is increased, and the display surface is seamless.

BRIEF DESCRIPTION OF THE SEVERAL VIEWS OF THE DRAWINGS

In order to explain the embodiments or the technical solutions in the prior art more clearly, the following will briefly introduce the drawings that need to be used in the description of the embodiments or the prior art. Obviously, the drawings in the following description are only some embodiments of the invention. For those of ordinary skill in the art, other drawings can be obtained based on these drawings without creative work.

Figure 1:
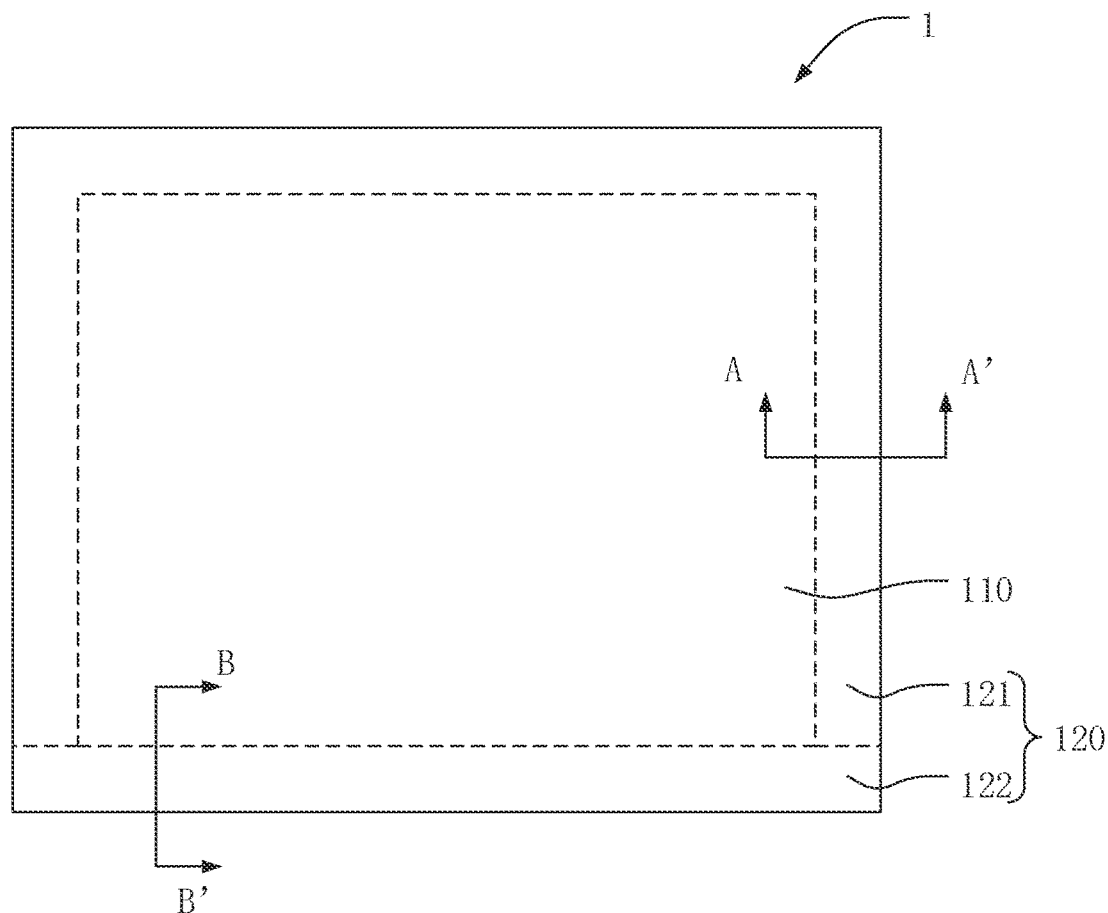
FIG. 1 is a front view of a display device in embodiment 1 of the present invention.

Components in the figure are represented as follows:
Display device 1; display area 110;
Non-display area 120; border area 121;

Bottom frame area 122; back frame 10;
Cavity 11; bottom plate 12;
Side plate 13; first frame 13A;
Second frame 13B; display module 20;
Backlight module 21; display panel 22;
Polarizer 30; Main body 31;
Extension part 32; light-shielding layer 40;
First light-shielding layer 41; second light-shielding layer 42;
High-viscosity layer 50; front frame 60;
Fixing layer 70.

DESCRIPTION OF SPECIFIC EMBODIMENTS OF THE INVENTION

Hereinafter, the preferred embodiments of the present invention will be introduced with reference to the drawings of the specification to prove that the present invention can be implemented. The embodiments of the invention can fully introduce the invention to those skilled in the art, so that its technical content is clearer and easier to understand. The present invention can be embodied by many different forms of invention embodiments. The protection scope of the present invention is not limited to the embodiments mentioned in the text.

In the drawings, components with the same structure are denoted by the same numerals. Components with similar structures or functions are represented by similar numerals. The size and thickness of each component shown in the drawings are arbitrarily shown. The present invention does not limit the size and thickness of each component. In order to make the illustration clearer, the thickness of the components is appropriately exaggerated in some places in the drawings.

In addition, the following descriptions of the embodiments of the invention refer to the attached drawings to illustrate specific invention embodiments that the invention can be implemented. Directional terms mentioned in the present invention, such as "upper", "lower", "front", "rear", "left", "right", "inner", "outer", "side", etc., are only the directions for referring to the attached drawings. Therefore, the directional terms used are for a better and clearer description and understanding of the present invention. It does not indicate or imply that the pointed device or element must have a specific orientation, be constructed, and operated in a specific orientation. Therefore, it cannot be understood as a limitation to the present invention. In addition, the terms "first", "second", "third", etc. are only used for descriptive purposes, and cannot be understood as indicating or implying relative importance.

When certain components are described as being "on" another component, the component may be directly placed on the other component. There may also be an intermediate part, the part being placed on the middle part, and the middle part being placed on another part. When a component is described as being "mounted to" or "connected to" another component, the two can be understood as directly "installed" or "connected". Or one component is indirectly "mounted to" or "connected to" another component through an intermediate component.

Embodiment 1

In the embodiment of the present invention, a rectangular display device 1 is provided, which includes a display area 110 and a non-display area 120 surrounding the display area 110. The display screen is generally presented in the display area 110. In the non-display area 120, a frame for fixing and protecting the display device 1 is generally provided. Specifically, the non-display area 120 includes a frame area 121 and a bottom frame area 122. As shown in FIG. 1, taking the placement of the display device 1 for viewing the display screen from the front angle as an example, the frame area 121 presents an inverted U shape and is connected with three sides of the rectangular display area 110. The bottom frame area 122 is located at the bottom end of the display device 1, and its head and tail are respectively connected to the two ends of the frame area 121 and combined to form a non-display area 120 surrounding the display area 110.

Figure 2:
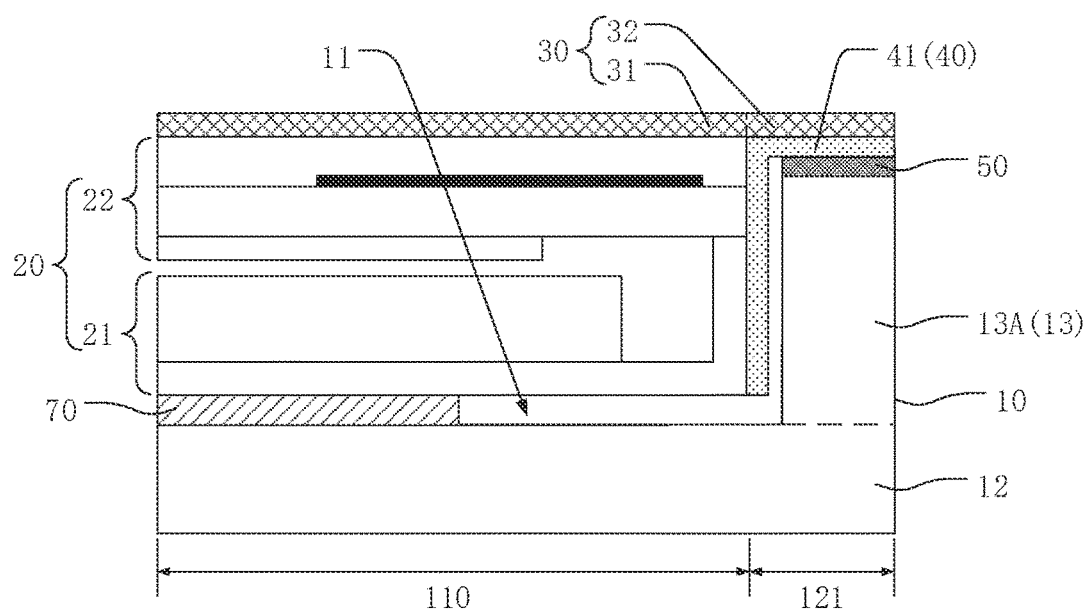
FIG. 2 is a schematic cross-sectional structure diagram of the display device in FIG. 1 at AA'.
Figure 3:
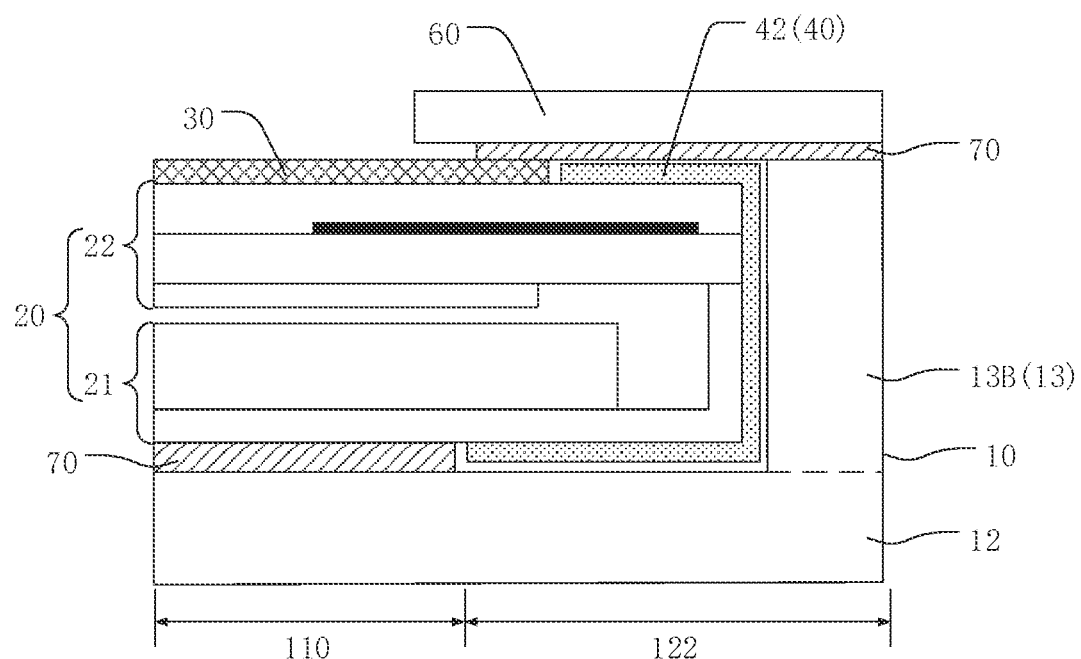
FIG. 3 is a schematic cross-sectional structure diagram of the display device in FIG. 1 at BB'.

As shown in FIG. 2 and FIG. 3, the display device 1 includes a back frame 10, a display module 20, a polarizer 30, and a front frame 60.

The frame body of the back frame 10 includes a bottom plate 12 and four side plates 13. The bottom plate 12 covers the display area 110 and the non-display area 120. The side plates 13 are connected end to end in sequence and vertically connected to the bottom plate 12 in the non-display area 120. The side plate 13 includes a first frame 13A and a second frame 13B. The first frame 13A is located in the frame area 121. The second frame body 13B is located in the bottom frame area 122. The back frame 10 is used to protect the back and sides of the display device 1.

The bottom plate 12 and the side plate 13 surround a cavity 11. The display module 20 is disposed in the cavity 11. The display module 20 is a liquid crystal display module 20 (LCD module, LCM), which includes a backlight module 21 and a liquid crystal display panel 22. The backlight module 21 is disposed on the bottom plate 12 of the back frame 10 and includes a backlight source and a number of optical films. The backlight source is used to provide the light source required for display. The optical film is used to guide refraction, reflection, and scattering directions of the light by improving an angular distribution of light without increasing the number of light sources, thereby uniformizing the light and improving a display brightness of the display device 1. The display panel 22 is disposed on a surface of the backlight module 21 away from the bottom plate 12, and includes an array substrate, a color filter substrate, a liquid crystal cell, and the like. The display panel 22 controls the deflection direction of the liquid crystal molecules in the liquid crystal cell through the electric field generated by the array substrate, so as to control whether the backlight light is transmitted or not, and then realize the transformation and control of the display screen. The light passing through the liquid crystal cell is filtered by the color filter substrate to convert the backlight light of a uniform color into display light of different colors, thereby realizing color display.

The polarizer 30 is disposed on the display module 20 in the cavity 11 and extends from the surface of the display module 20 to the first frame 13A of the back frame Specifically, the polarizer 30 includes a main body part 31 and an extension part 32. The main body part 31 is attached to a surface of the display module 20 away from the bottom plate 12. The edge of the main body part 31 extends from the display area 110 to the frame area 121 to form an extension part 32 located in the frame area 121. The extension part 32 is provided on a surface of the first frame away from the bottom plate 12. In addition, a surface of the extension part 32 away from the main body part 31 and a surface of the first frame body 13A away from the display module 20 are located on the same plane.

Further, in order to prevent a height difference between the polarizer 30 in the frame area 121 and the polarizer 30 in the bottom frame area 122, the height of the first frame 13A is reduced. The height of the first frame 13A is smaller than the height of the second frame 13B.

The polarizer 30 has a relatively high hardness, a relatively high compression resistance, and is not prone to breakage. The display module 20 can be protected while ensuring its basic function of polarization. In addition, the polarizer 30 of the frame area 121 in this embodiment can replace the front frame provided in the frame area in the prior art. The thickness of the display device 1 is reduced while the production cost is reduced. Further, the shielding of the front frame 60 is reduced, and the area of the non-display area 120 of the display device 1 can be reduced. The area of the display area 110 is increased without increasing the size of the display module 20, and the flatness of the display surface of the display device 1 is ensured, so as to realize a seamless full-screen display.

The extension part 32 of the polarizer 30 is pasted on a surface of the first frame 13A away from the bottom plate 12 through a high-viscosity layer 50. The material of the high-viscosity layer 50 is foam glue, which has the function of buffering and damping while fixing the polarizer 30, reducing the risk of fragmentation of the polarizer 30. In addition, the high-viscosity layer 50 can also fill the gap between the first frame 13A and the polarizer 30 to prevent dust from entering the interior of the display device 1.

The side of the display module 20 close to the second frame 13B extends into the bottom frame area 122. The front frame 60 is disposed on a surface of the display module 20 and the second frame body 13B in the bottom frame area 122 away from the bottom plate 12. The front frame 60 is used to protect the bottom edge of the display device 1 and can also share the gravity of the display module 20 for the second frame 13B to improve the pressure bearing capacity of the display device 1.

In the bottom frame area 122, the distance between the polarizer 30 and the second frame 13B is greater than the distance between the display module 20 and the second frame 13B. That is, as shown in FIG. 3, the frame width of the polarizer 30 in the bottom frame area 122 is smaller than the width of the display module 20 in the bottom frame area 122. The main body 31 of the polarizer 30 does not completely cover the display module 20 in the bottom frame area 122. To prevent light leakage in the non-display area 120, the orthographic projection of the front frame 60 on the back frame 10 and the orthographic projection of the polarizer 30 on the back frame 10 overlap. That is, the side of the bottom plate 12 away from the second frame 13B extends to a part of the surface of the polarizer 30 away from the display module 20.

The display device 1 further includes a light-shielding layer 40 and a fixing layer 70. As shown in FIG. 2 and FIG. 3, the fixing layer 70 is provided between the display module 20 and the bottom plate 12 of the back frame 10, between the bottom plate 12 and the second frame 13B, and between the polarizer 30 and the display module 20. The fixing layer 70 is used for pasting and fixing the display module 20 of the display device 1 to prevent the display module 20 from being displaced during movement and use. The light-shielding layer 40 is located in the non-display area 120 and covers the edge of the display module 20. The light-shielding layer 40 is made of a black opaque glue material, which is used to prevent light leakage at the edge of the display module 20 and cause waste of light sources and affect the display effect of the display device 1. The light-shielding layer 40 includes a first light-shielding layer 41 and a second light-shielding layer 42.

As shown in FIG. 2, the first light-shielding layer 41 is located in the frame area 121. The first light-shielding layer 41 covers a surface of the display module 20 facing the first frame 13A, extends from the surface of the display module 20 to between the extension part 32 of the polarizer 30 and the high-viscosity layer 50, and covers a surface of the extension part 32 facing the first frame 13A. The first light-shielding layer 41 only shields the side surface of the display module 20. This is beneficial to increase an area of the display area 110, thereby increasing a screen-to-body ratio of the display device 1 and improving user experience.

As shown in FIG. 3, the second light-shielding layer 42 is located in the bottom frame area 122. The second light-shielding layer 42 covers a surface of the display module 20 facing the second frame 13B. An end of the second light-shielding layer 42 close to the bottom plate 12 extends from a surface of the display module 20 toward the second frame 13B to cover an edge of the display module 20 toward a surface of the front frame 60. The end of the second light-shielding layer 42 close to the front frame 60 extends from a surface of the display module 20 facing the second frame 13B to cover a surface of the display module 20 facing the front frame 60. The second light-shielding layer 42 and the polarizer 30 are jointly disposed on the same surface of the display module 20.

Further, to ensure that the bottom plate 12 can be attached to the second frame 13B and the polarizer 30 evenly. A surface of the polarizer 30 away from the display module 20 and a surface of the second frame 13B away from the bottom frame are located on the same plane.

In the display device provided by the embodiment of the present invention, the polarizer is extended to the back frame in the frame area. The display module is protected by the polarizer, thereby removing the front frame provided in the frame area in the prior art. This reduces the thickness of the display device and increases the area of the display area, realizing a full-screen display and a seamless display surface of the display device.

In the embodiment of the present invention, a rectangular display device is taken as an example for description for ease of understanding. However, in other embodiments of the present invention, the display device may also have other shapes such as a triangle, a pentagon, a hexagon, etc., and its layered structure is similar to that of a rectangular display device, so it will not be repeated here. Based on the embodiments in this application, all other embodiments obtained by those of ordinary skill in the art without creative work shall fall within the protection scope of this application.

Embodiment 2

Figure 4:
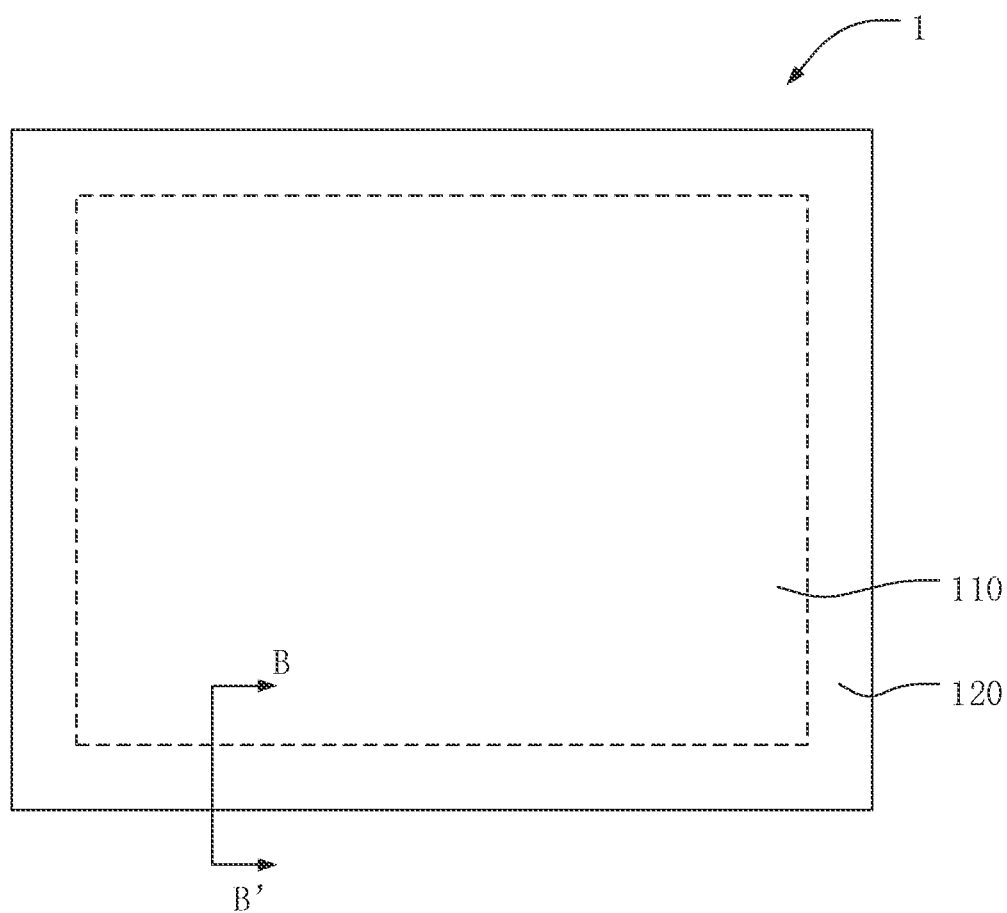
FIG. 4 is a front view of a display device in embodiment 2 of the present invention.

In the embodiment of the present invention, a rectangular display device 1 is provided. As shown in FIG. 4, the display device 1 includes a display area 110 and a non-display area 120 surrounding the display area 110. The display screen is generally presented in the display area 110. In the non-display area 120, a frame for fixing and protecting the display device 1 is generally provided.

Figure 5:
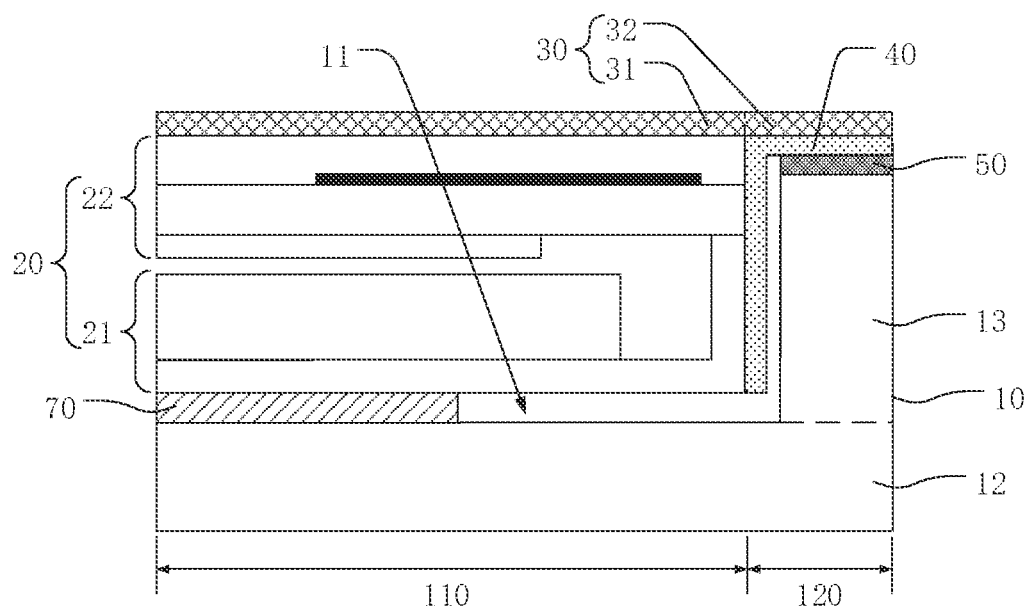
FIG. 5 is a schematic cross-sectional structure diagram of the display device in FIG. 4 at BB'.

As shown in FIG. 5, the display device 1 includes a back frame 10, a display module 20, and a polarizer 30.

The frame body of the back frame 10 includes a bottom plate 12 and four side plates 13. The bottom plate 12 covers the display area 110 and the non-display area 120. The side plates 13 are connected end to end in sequence and vertically connected to the bottom plate 12 in the non-display area 120. The back frame 10 is used to protect the back and sides of the display device 1.

The bottom plate 12 and the side plate 13 surround a cavity 11. The display module 20 is disposed in the cavity 11. The display module 20 is a liquid crystal display module 20 (LCD module, LCM), which includes a backlight module 21 and a liquid crystal display panel 22. The backlight module 21 is disposed on the bottom plate 12 of the back frame 10 and includes a backlight source and a number of optical films. The backlight source is used to provide the light source required for display. The optical film is used to guide the refraction, reflection, and scattering directions of the light by improving the angular distribution of the light without increasing the number of light sources, thereby uniformizing the light and improving the display brightness of the display device 1. The display panel 22 is disposed on a surface of the backlight module 21 away from the bottom plate 12, and includes an array substrate, a color filter substrate, a liquid crystal cell, and the like. The display panel 22 controls the deflection direction of the liquid crystal molecules in the liquid crystal cell through the electric field generated by the array substrate, so as to control whether the backlight light is transmitted or not, so as to realize the transformation and control of the display image. The light passing through the liquid crystal cell is filtered by the color filter substrate to convert the backlight light of a uniform color into display light of different colors, thereby realizing color display.

The polarizer 30 is disposed on the display module 20 and covers the display area 110 and the non-display area 120. Specifically, the polarizer 30 includes a main body part 31 and an extension part 32. The main body 31 is attached to a surface of the display module 20 away from the bottom plate 12 and is located in the display area 110. The periphery of the main body part 31 extends from the display area 110 to the non-display area 120 to form an extension part 32 provided on the side plate 13 of the back frame 10. The extension part 32 is located in the non-display area 120 and is provided on a surface of the side plate 13 away from the bottom plate 12. The width of the polarizer 30 is the same as the width of the back frame 10 and corresponds to each other. The polarizer 30 and the bottom plate 12 and the side plate 13 jointly surround a closed cavity 11, and the display module 20 is disposed in the cavity 11.

The polarizer 30 has a relatively high hardness and a relatively high compression resistance, is not prone to breakage, and can protect the display module 20 while ensuring its basic function of polarization. Moreover, the polarizer 30 in the non-display area 120 in this embodiment can replace the front frame 60 provided in the non-display area 120 in the prior art. This reduces the thickness of the display device 1 while reducing the production cost. In addition, by reducing the shielding of the front frame 60, the area of the non-display area 120 of the display device 1 can be reduced. The area of the display area 110 is increased without increasing the size of the display module 20, and the flatness of the display surface of the display device 1 is ensured, so as to realize a seamless full-screen display.

The extension part 32 of the polarizer 30 is pasted on a surface of the side plate 13 away from the bottom plate 12 through a high-viscosity layer 50. The material of the high-viscosity layer 50 is foam glue, which has the function of buffering and damping while fixing the polarizer 30, reducing the risk of fragmentation of the polarizer 30. In addition, the high-viscosity layer 50 can also fill the gap between the side frame and the polarizer 30 to prevent dust from entering the interior of the display device 1.

The display device 1 further includes a light-shielding layer 40 and a fixing layer 70. As shown in FIG. 5, the fixing layer 70 is provided between the display module 20 and the bottom plate 12 of the back frame 10. The fixing layer 70 is used for pasting and fixing the display module 20 of the display device 1 to prevent the display module 20 from being displaced during movement and use. The light-shielding layer 40 is located in the non-display area 120 and covers a surface of the display module 20 facing the side plate 13. The light-shielding layer 40 extends from the surface of the display module 20 to between the extension part 32 of the polarizer 30 and the high-viscosity layer 50. The light-shielding layer 40 covers a surface of the extension part 32 facing the side plate 13. The light-shielding layer 40 is made of a black opaque glue material, which is used to prevent light leakage at the edge of the display module 20 and cause waste of light sources and affect the display effect of the display device 1. The light-shielding layer 40 only covers the sides of the display module 20, which is beneficial to increase the area of the display area 110, thereby increasing the screen-to-body ratio of the display device 1 and improving user experience.

In the display device provided by the embodiment of the present invention, the polarizer is extended to the back frame in the non-display area. The display module is protected by the polarizer. Compared with the display device in the first embodiment of the present invention, the display device in the second embodiment can further realize the lightness and thinness of the display device and increase the area of the display area, and completely eliminate the setting of the front frame. The display panel of the display device has only an integrated polarizer, which perfectly realizes the seamless display of the display device.

Although the present invention is described herein with reference to specific embodiments, it should be understood that these embodiments are merely examples of the principles and applications of the present invention. It should therefore be understood that many modifications can be made to the exemplary embodiments, and other arrangements can be devised as long as they do not deviate from the spirit and scope of the invention as defined by the appended claims. It should be understood that different dependent claims and features described herein can be combined in ways different from those described in the original claims. It can also be understood that the features described in combination with a single embodiment can be used in other described embodiments.

What is claimed is:

1. A display device, comprising:
    a back frame having a cavity;
    a display module disposed in the cavity;
    a polarizer disposed on the display module and a body of the back frame surrounding the display module;
    a display area and a non-display area surrounding the display area;
    wherein the he back frame comprising:
    a bottom plate disposed on a surface of the display module away from the polarizer and covering the display area and the non-display area;
    a side plate vertically connected to the bottom plate and located in the non-display area;
    wherein the bottom plate and the side plate enclose the cavity;
    wherein the non-display area comprises a frame area and a bottom frame area connected to the frame area;

wherein the polarizer comprises:
a main body disposed on the display module and covering the display area;
an extension part disposed on the side plate and located in the frame area;
wherein the side panel comprises:
a first frame located in the frame area;
a second frame located in the bottom frame area;
wherein a height of the first frame is smaller than a height of the second frame;
wherein a surface of the second frame away from the bottom plate and a surface of the polarizer away from the display module are located on a same plane.

2. The display device according to claim 1, wherein:
the display module extends from the display area into the bottom frame area;
in the bottom frame area, a distance between the display module and the second frame is smaller than a distance between the polarizer and the second frame.

3. The display device according to claim 1, further comprising:
a light-shielding layer covering a surface of the display module facing the side plate and being located in the non-display area;
a high-viscosity layer disposed between the extension part and the side plate.

4. The display device according to claim 3, wherein the light-shielding layer comprises:
a first light-shielding layer located in the frame area, wherein an end of the first light-shielding layer close to the polarizer extends from a surface of the display module facing the side plate to a surface of the extension part facing the side plate;
a second light-shielding layer located in the bottom frame area, wherein two ends of the second light-shielding layer respectively extend to a surface of the display device facing the bottom plate and a surface of the display device facing a front frame.

5. The display device according to claim 1, further comprising:
a front frame disposed on an edge of the display module and located in the bottom frame area.

6. The display device according to claim 1, wherein the display module comprises:
a backlight module disposed in the cavity;
a display panel disposed between the backlight module and the polarizer.

7. The display device according to claim 1, further comprising:
a fixing layer disposed between the display module and the back frame.

8. A display device, comprising:
a back frame having a cavity;
a display module disposed in the cavity;
a polarizer disposed on the display module and a body of the back frame surrounding the display module;
a display area and a non-display area surrounding the display area;
wherein the he back frame comprising:
a bottom plate disposed on a surface of the display module away from the polarizer and covering the display area and the non-display area;
a side plate vertically connected to the bottom plate and located in the non-display area;
wherein the bottom plate and the side plate enclose the cavity;
wherein the non-display area comprises a frame area and a bottom frame area connected to the frame area;
wherein the polarizer comprises:
a main body disposed on the display module and covering the display area;
an extension part disposed on the side plate and located in the frame area;
wherein the display device further comprises:
a light-shielding layer covering a surface of the display module facing the side plate and being located in the non-display area;
a high-viscosity layer disposed between the extension part and the side plate.

9. The display device according to claim 8, wherein the side panel comprises:
a first frame located in the frame area;
a second frame located in the bottom frame area;
wherein a height of the first frame is smaller than a height of the second frame;
wherein a surface of the second frame away from the bottom plate and a surface of the polarizer away from the display module are located on a same plane.

10. The display device according to claim 9, wherein:
the display module extends from the display area into the bottom frame area;
in the bottom frame area, a distance between the display module and the second frame is smaller than a distance between the polarizer and the second frame.

11. The display device according to claim 10, wherein the light-shielding layer comprises:
a first light-shielding layer located in the frame area, wherein an end of the first light-shielding layer close to the polarizer extends from a surface of the display module facing the side plate to a surface of the extension part facing the side plate;
a second light-shielding layer located in the bottom frame area, wherein two ends of the second light-shielding layer respectively extend to a surface of the display device facing the bottom plate and a surface of the display device facing a front frame.

12. The display device according to claim 8, further comprising:
a front frame disposed on an edge of the display module and located in the bottom frame area.

13. The display device according to claim 8, wherein the display module comprises:
a backlight module disposed in the cavity;
a display panel disposed between the backlight module and the polarizer.

14. The display device according to claim 8, further comprising:
a fixing layer disposed between the display module and the back frame.

15. A display device, comprising:
a back frame having a cavity;
a display module disposed in the cavity;
a polarizer disposed on the display module and a body of the back frame surrounding the display module;
a display area and a non-display area surrounding the display area;
wherein the he back frame comprising:
a bottom plate disposed on a surface of the display module away from the polarizer and covering the display area and the non-display area;
a side plate vertically connected to the bottom plate and located in the non-display area;

wherein the bottom plate and the side plate enclose the cavity;

wherein the non-display area comprises a frame area and a bottom frame area connected to the frame area;

wherein the polarizer comprises:

a main body disposed on the display module and covering the display area;

an extension part disposed on the side plate and located in the frame area;

wherein the display device further comprises:

a front frame disposed on an edge of the display module and located in the bottom frame area.

16. The display device according to claim 15, wherein the side panel comprises:

a first frame located in the frame area;

a second frame located in the bottom frame area;

wherein a height of the first frame is smaller than a height of the second frame;

wherein a surface of the second frame away from the bottom plate and a surface of the polarizer away from the display module are located on a same plane.

17. The display device according to claim 16, wherein:

the display module extends from the display area into the bottom frame area;

in the bottom frame area, a distance between the display module and the second frame is smaller than a distance between the polarizer and the second frame.

18. The display device according to claim 15, further comprising:

a light-shielding layer covering a surface of the display module facing the side plate and being located in the non-display area;

a high-viscosity layer disposed between the extension part and the side plate.

19. The display device according to claim 18, wherein the light-shielding layer comprises:

a first light-shielding layer located in the frame area, wherein an end of the first light-shielding layer close to the polarizer extends from a surface of the display module facing the side plate to a surface of the extension part facing the side plate;

a second light-shielding layer located in the bottom frame area, wherein two ends of the second light-shielding layer respectively extend to a surface of the display device facing the bottom plate and a surface of the display device facing a front frame.

20. The display device according to claim 15, wherein the display module comprises:

a backlight module disposed in the cavity;

a display panel disposed between the backlight module and the polarizer.

* * * * *